May 8, 1973 SABURO NABETA ET AL 3,732,255
PROCESS FOR OPTICAL RESOLUTION OF O-ACETYLPANTOLACTONE
Filed Sept. 30, 1969
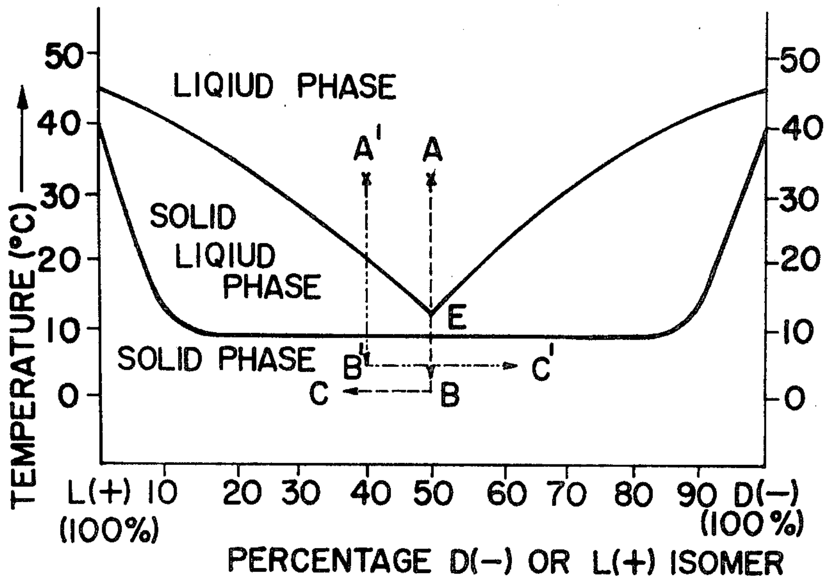

United States Patent Office 3,732,255

Patented May 8, 1973

3,732,255

PROCESS FOR OPTICAL RESOLUTION OF O-ACETYLPANTOLACTONE

Saburo Nabeta, Ieji Kuniyoshi, and Masahiro Inagaki, Chiba, Japan, assignors to Daiichi Seiyaku Company, Limited, Tokyo, Japan Filed Sept. 30, 1969, Ser. No. 862,436
Claims priority, application Japan, Sept. 30, 1968, 43/70,105
Int. Cl. C07d 5/06
U.S. Cl. 260—343.6 6 Claims

ABSTRACT OF THE DISCLOSURE

Optically resolving a mixture of D(−)-O-acetylpantolactone and L(+)-O-acetylpantolactone by seeding a homogeneous liquid mixture of these two materials with optically active seed crystals of either of the two enantiomers in a binary system. The same isomer as the seed crystals is crystallized and the precipitate can be recovered.

BACKGROUND OF THE INVENTION

Field of the invention

The present invention relates to a novel process for the optical resolution of O-acetylpantolactone in a binary system.

D(−)-pantolactone is an intermediate useful in medicines, such as calcium D(+)-pantothenate, D(+)-pantothenyl alcohol, D(+)-panthetin and so on. It has generally been prepared by the optical resolution of racemic pantolactone.

Description of the prior art

In processes for obtaining optically active pantolactone from racemic pantolactone, the following agents have been used for the resolution thereof:

Quinine (U.S. Pat. No. 2,319,545), brucine (U.S. Pat. No. 2,390,281) or strychnine (Chemical Abstracts 41, 6199 (1947)); galactamine (British Pat. No. 773,174), l-α-phenylethylamine (Pharmazie 12, 254 (1957) German Pat. No. 16,482 and U.S. Pat. No. 3,185,710) and L-amino acids (Japanese patent publication No. 12149/68).

Further, it is known that racemic pantolactone reacts with aqueous ammonia to give ammonium pantoate, which can be resolved by selective crystallization from aqueous alcohols into optically active isomers of ammonium pantoate (Belgian Pat. No. 698,139). However, these known methods have various disadvantageous and unsatisfactory features from an industrial viewpoint.

For instance, in the case of using a resolving agent, resolving agents are so expensive that complicated procedures and operations are required in order to get the best recovery of the resolving agent. Further, the yields are not always good. For instance, in producing racemic ammonium pantoate, it has been found that the formation of racemic pantoamide is inevitable (as a byproduct) in the reaction of racemic pantolactone with an aqueous ammonium solution. Accordingly, it is necessary to purify racemic ammonium pantoate. Further, the stability of a supersaturated solution of racemic ammonium pantoate is not satisfactory enough for selective crystallization, and consequently contamination of racemic pantolactone in the optically active isomer is inevitable.

As stated above, the hitherto known methods are not advantageous for an industrial use.

As the result of studies on the optical resolution of pantolactone, the inventors have succeeded in establishing a very advantageous method for the production of optically active pantolactone obtained via the resolution of DL-O-acetylpantolactone.

SUMMARY OF THE INVENTION

The present invention provides a novel method for the optical resolution of a mixture of D-acetylpantolactone and L(+)-O-acetylpantolactone which comprises seeding a homogeneous phase composed of D(−)-O-acetylpantolactone and L(+)-O-acetylpantolactone with optically active seed crystals of either of the two optical isomers in a binary system. The terminology "binary system" indicates a homogeneous liquid phase composed of the two optically active isomers, D(−)-O-acetylpantolactone and L(+)-O-acetylpantolactone. Optical resolution is at a low temperature, preferably below 13.5° C., and the same isomer as the seed crystal is crystallized from the mixture. The precipitate can be recovered to yield the final product.

An object of this invention is to provide an advantageous method for the optical resolution of O-acetylpantolactone which, followed by hydrolysis of the optically active O-acetylpantolactone, can be used to produce optically active pantolactone.

BRIEF DESCRIPTION OF THE DRAWING

The drawing is a phase diagram of temperature versus the percentage of D(−) or L(+) isomer.

DETAILED DESCRIPTION OF THE PREFERRED EMBODIMENTS

In accordance with the present invention, optically active pantolactone can be easily obtained in the following manner.

Racemic pantolactone can be acetylated to give a racemic O-acetylpantolactone by any standard state of the art method, and then it is directly resolved to optically active lactones, D(−)-O-acetylpantolactone and L(+)-O-acetylpantolactone, in a binary system. Further the optically active lactones are then deacetylated by hydrolysis with a diluted mineral acid to provide the optically active pantolactone.

With regard to O-acetylpantolactone, it is stated in the literature (J.A.C.S. 62, 2665 (1941)) merely that only one D(−)-O-acetylpantolactone has been isolated as crystals (M.P. 44°–45° C. and $[\alpha]_D^{29}$ −13.1° (C.=2.27, 95% ethanol). However, the D(−)-O-acetylpantolactone reported was synthesized by the acetylation of optically active D(−)-pantolactone. No process for the optical resolution of racemic O-acetylpantolactone has been disclosed.

The most characteristic or unique point of this invention is the fact that the optical resolution by the application of selective crystallization is carried out in a binary system. No process has been heretofore known for optical resolution in a binary system which does not use a resolving agent or solvent for selective crystallization.

The inventors have found that a homogeneous liquid phase composed of two optical isomers, D(−)-O-acetylpantolactone and L(+)-O-acetylpantolactone, can be resolved by selectively seeding with either optically active isomer thereof in a binary system at a temperature below 13.5° C. They have also found that this process is possible in a binary system only when a considerable difference exists between the melting point of the racemic mixture as a whole and the melting point of each optically active isomer contained therein. Further (at the same time) a high stability of the mutually dissolved liquid of both isomers is required in the supercooled state.

More particularly, illustrating resolution in a binary system, FIG. 1 shows a phase diagram for a pair of optical isomers of O-acetylpantolactone.

For instance, after melting the racemic mixture at temperature A which is higher than temperature E(13.5° C.)

the melting point of the racemic mixture, supercooling the racemic mixture melt down to temperature B (which is still below the melting point of the racemic mixture) and seeding selectively with seed crystals of, for example, D(−)-O-acetylpantolactone, with stirring, D(−)-O-acetylpantolactone begins to crystallize. As the crystallization proceeds, the liquid composition of the binary system is converted from point B to point C.

In the case of the resolution of a mixture (not the racemic mixture) which includes either active isomer more than the antipode, the same operation is applicable as in the case of FIG. 1, i.e., where line A'-B'-C' shows this case, namely seeding the L-excess mixture liquid with L-isomer.

Upon progressing with crystallization of the desired isomer in a binary system, a proportion of the both D- and L-components will reach such a point as to result in a supersaturated state of the unseeded isomer and at this stage one cannot keep the system in the liquid phase. In a binary system, therefore, it is preferable, in an industrial resolution, to stop the crystallizing just before the absolute value of the optical rotation of binary system is about to decrease. In other words, the absolute value of the optical rotation of the system is an indication of the maximum amount of an isomer that can be crystallized from the system. As an example, assuming the value of the optical rotation of the homogeneous liquid phase to be zero, as one isomer is crystallized form the system, the absolute value of the optical rotation value of the homogeneous liquid phase will increase only so long as the isomer is being crystallized out since once the maximum crystallization is reached, the absolute value of the optical rotation will no longer increase. For instance, such optically active crystals having an absolute value of a specific rotation of 12.5°–13.5° (optical purity=89–96%) may be obtained, if the split crystals are collected when the absolute value of the optical rotation of the binary system reaches its maximum point. To control the crystallization, the maximum point of rotation in a binary system is continuously checked during performance of crystallizing resolution.

For the purpose of making filtration easy, it is preferable to add a small amount of organic solvent to the binary system either before crystallizing resolution or after crystallizing. As such an organic solvent, one which is soluble in O-acetylpantolactone may be utilized. For example, alcohols such as methanol, ethanol, or isopropanol, ethers such as ethylether, n-propylether or isopropylether, halogeno hydrocarbons such as dichloroether, dichloroethane or trichloroethylene, aromatic hydrocarbons such as benzene, xylene or toluene, amides such as dimethylformamide or acetoamide, ketones such as acetone or methylethylketone, esters such as ethyl acetate, n-propyl acetate, isobutyl acetate, n-butyl acetate, isoamyl acetate or isopropyl acetate, aqueous organic solvents thereof, or mixtures of solvents thereof, are applicable to this purpose.

For adding such a solvent before crystallizing resolution, the amount of such a solvent which is added should be not more than 35% of the liquid phase, by weight. If the amount is more than 35%, it causes an undesirable extreme stabilization of the liquid system in its supercooled state, and consequently, the yield of the resolution may be reduced.

This feature of a binary system is fundamentally different from a ternary system which uses a great amount of solvent for selective crystallization. In the present invention the amount of solvent added must be limited to the extent of merely reducing the viscosity of the binary phase.

With regard to seeding crystals of optically active O-acetylpantolactone, the finer the particle size, the more suitable it is for resolution. Effective resolution may be carried out with seeding crystals in an amount of less than 5%, based on the whole homogeneous liquid phase.

The collected crystals of O-acetylpantolactone thus resolved may be further purified by washing or recrystallization from a suitable solvent (such as isopropylether) to provide pure crystals having an absolute optical rotation value of more than 13.7° (optical purity; more than 98%).

The hydrolysis of the resolved O-acetylpantolactone is carried out by refluxing it with mineral acid in the usual manner for hydrolysis. Optically active pantolactone can be obtained from the reaction solution by extracting with a suitable solvent such as dichloroethane, after neutralization and removal of acetic acid and water.

One starting material, DL-O-acetylpantolactone, for carrying out the resolution of this invention is prepared by the reaction of DL-pantolactone with an equivalent or greater than equivalent volume of acetic anhydride or acetyl chloride. The acetylated mixture is distilled under reduced pressure to give racemic O-acetylpantolactone (B.P. 130°–135° C./10 mm. Hg. M.P. 13.5° C.) at a high yield.

The present invention will be illustrated with more particularity by the following examples.

EXAMPLE 1

1300 g. of racemic pantolactone was dissolved in 1530 g. of acetic anhydride and the mixture was boiled with reflux for three hours. After acetic acid and excessive acetic anhydride were removed, the residue was distilled under reduced pressure to obtain 1620 g. of racemic O-acetylpantolactone. (Yield: 94.2%, B.P. 125°–130° C./10 mm. Hg.)

The purity of O-acetylpantolactone, by titration of the acetyl groups, showed to be 100%. In the same manner D(−)-O-acetylpantolactone and L(+)-O-acetylpantolactone were obtained. (Yield: 92–95%, $[\alpha]_D^{25}-14°$, and $[\alpha]_D^{25}+14.0°$).

10 g. of D(−)-O-acetylpantolactone having an $[\alpha]_D^{25}-14.0°$ was added to 200 g. of racemic O-acetylpantolactone as obtained above. The mixture was dissolved by heating, was cooled to 9–10° C., and then the mixture was seeded with 1.0 g. of D(−)-O-acetylpantolactone having an $[\alpha]_D^{25}-14.0°$ with stirring. After 1.75 hours, crystals were collected by filtration to obtain 23.0 g. of crystals having an $[\alpha]_D^{25}-12.8°$. 20.0 g. of the above-obtained crystals were washed with 14 ml. of isopropylether at a temperature of 4–6° C. to give 18.1 g. of precipitate having an $[\alpha]_D^{25}-13.8°$.

Further, racemic O-acetylpantolactone was added to the filtrate in the amount of 2.00 g., and the mixture was then dissolved with heating. After cooling to 9–10° C. the mixture was seeded with 1.0 g. of L(+)-O-acetylpantolactone ($[\alpha]_D^{25}+14.0°$) with stirring. After two hours, the crystals were collected by filtration to obtain 23.9 g. of crystals having an $[\alpha]_D^{25}+13.1°$.

Twenty g. of these crystals were washed with 10 ml. of isopropylether at a temperature of 4–6° C. to give 18.0 g. of crystals having an $[\alpha]_D^{25}+13.9°$.

Ten g. of D(−)-O-acetylpantolactone having an $[\alpha]_D^{25}-13.9°$ obtained from the above process was boiled under reflux with 10 ml. of 1.0% aqueous hydrochloric acid for 1.5 hours. The resulting water, acetic acid and hydrochloric acid were distilled off under reduced pressure. The residue was cooled to room temperature to obtain 7.3 g. of white crystals. The yield was 97%, $[\alpha]_D^{25}-48.5°$ (c.=2, water). The purity of the pantolactone was 99.5%, by an acid-base titration.

Ten g. of L(+)-D-acetylpantolactone having an $[\alpha]_D^{25}+13.9°$ were boiled under reflux with 10 ml. of 1.0% sulfuric acid for 1.5 hours. The reaction mixture was then neutralized with sodium carbonate to a pH of 6.0 and water was distilled off under reduced pressure. The residue was extracted with dichloroethane and then the solvent was removed to give 6.9 g. of L(+)-pantolactone having an $[\alpha]_D^{25}+48.8°$. The yield was 98% (purity: 98.8%).

EXAMPLE 2

The mixture of 200 g. of racemic O-acetylpantolactone, 10 g. of D(—)-O-acetylpantolactone having an $[\alpha]_D^{25}-14.0°$ synthesized in Example 1 and 30 ml. of isopropylether was cooled up to 4°–5° C., and the mixture was seeded with 1.0 g. of D(—)-O-acetylpantolactone having an $[\alpha]_D^{25}-14.0°$, with stirring. After two hours, crystals were collected by filtration to obtain 24.0 g. of crystals having an $[\alpha]_D^{25}-12.9°$.

EXAMPLE 3

Eighteen ml. of 80% aqueous isopropylalcohol were added to 200 g. of racemic O-acetylpantolactone as synthesized in Example 1. The mixture was cooled to 0° C., and then seeded with 1.0 g. of L(+)-O-acetylpantolactone having an $[\alpha]_D^{25}+14.0°$, with stirring. 2.5 hours after seeding, 12.0 g. of crystals having an $[\alpha]_D^{25}+13.0°$ were obtained.

What is claimed is:

1. A method for the optical resolution of a homogeneous liquid phase composed of D(—)-O-acetylpantolactone and L(+)-O-acetylpantolactone which comprises selectively seeding said homogeneous liquid phase with optically active seed crystals of either of the two isomers at a temperature below 13.5° C. to thereby crystallize the same isomer as the seed crystals, and recovering the precipitate.

2. The method according to claim 1 in which the resolution is carried out by the addition of less than 35% by weight, based upon the weight of the homogeneous liquid phase, of a solvent in which O-acetylpantolactone is soluble selected from the group consisting of alcohols, ethers, halogenated hydrocarbons, aromatic hydrocarbons, amides, ketones, esters and mixtures thereof.

3. The method according to claim 1 further comprising adding to the product of the selective seeding operation, prior to the recovering step, a solvent in which O-acetylpantolactone is soluble selected from the group consisting of alcohols, halogenated hydrocarbons, aromatic hydrocarbons, amides, ketones, esters and mixtures thereof.

4. The method according to claim 2 where the solvent is selected from the group consisting of methanol, ethanol, isopropanol, ethylether, n-propylether, isopropylether, dichloroethane, trichloroethylene, benzene, xylene, toluene, dimethylformamide, acetoamide, acetone, methylethylketone, ethyl acetate, n-propyl acetate, isobutyl acetate, n-butyl acetate, isoamyl acetate, isopropyl acetate, mixtures of water and said solvents, and mixtures thereof.

5. The method according to claim 3 wherein the solvent is selected from the group consisting of methanol, ethanol, isopropanol, ethylether, n-propylether, isopropylether, dichloroether, dichloroethane, trichloroethylene, benzene, xylene, toluene, dimethylformamide, acetoamide, acetone, methylethylketone, ethylacetate, n-propylacetate, isobutylacetate, n-butylacetate, isoamylacetate, isopropylacetate, mixtures of water and said solvents, and mixtures thereof.

6. The method according to claim 1 wherein said seed crystals are added in an amount of less than 5% by weight, based upon the weight of the entire homogeneous liquid phase.

References Cited

UNITED STATES PATENTS 3,038,937 6/1962 Cave ............ 260—534 G

ALEX MAZEL, Primary Examiner

JOSE TOVAR, Assistant Examiner